Aug. 15, 1961 L. V. McNAMARA 2,996,123
PROPELLER MECHANICAL LOW PITCH STOP
Filed June 17, 1959 2 Sheets-Sheet 1

INVENTOR.
Lawrence V. McNamara
BY
His Attorney

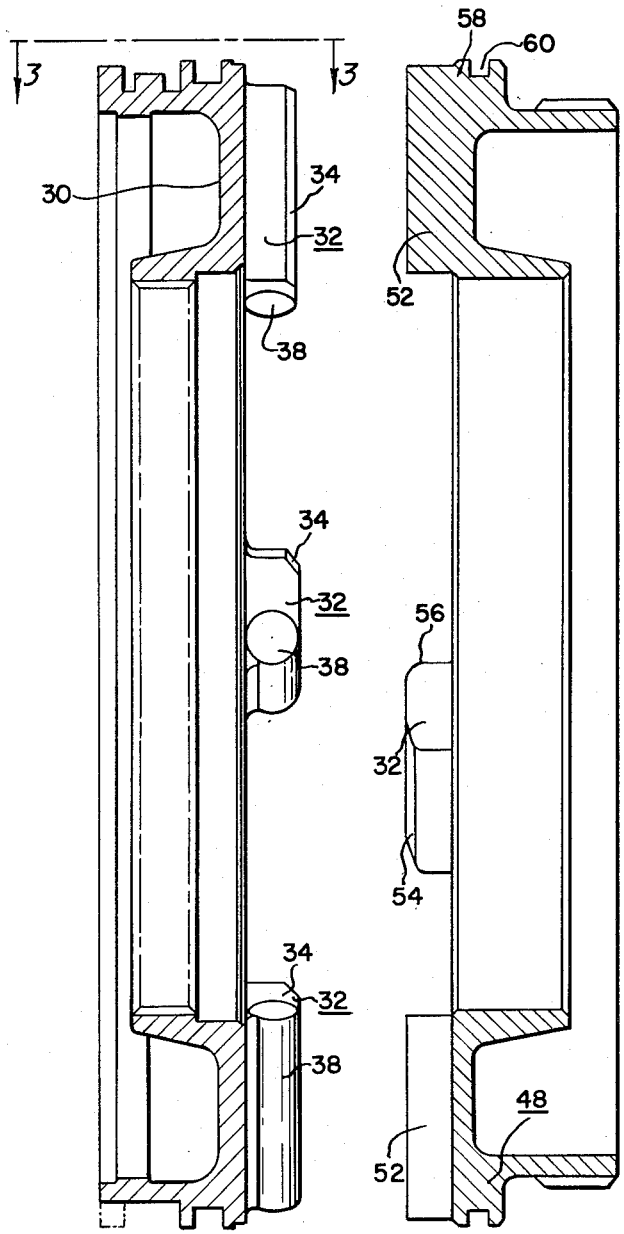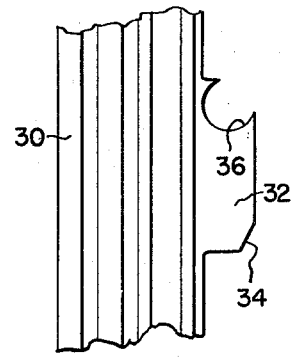

United States Patent Office 2,996,123
Patented Aug. 15, 1961

2,996,123
PROPELLER MECHANICAL LOW PITCH STOP
Lawrence V. McNamara, New Carlisle, Ohio, assignor to General Motors Corporation, Detroit, Mich., a corporation of Delaware
Filed June 17, 1959, Ser. No. 820,968
8 Claims. (Cl. 170—160.32)

This invention pertains to propellers, and particularly to an improved mechanical low pitch stop for variable pitch propellers.

Mechanical low pitch stops are required in variable pitch propellers to prevent movement of the propeller blades into the reverse thrust range while the aircraft is in flight. Ordinarily, a mechanical low pitch stop is designed to prevent movement of the propeller blades below a minimum low angle at which propeller blades provide a minimum forward thrust, and this angle is known as the flight idle angle. When the fuel supply to the primary mover for driving the propeller is reduced to flight idle during governed speed operation, the governor controls the pitch changing mechanism so as to reduce propeller pitch in an effort to maintain propeller speed at the selected speed setting. As the pitch position of the propeller blades is decreased, the mechanical low pitch stop is engaged to prevent movement of the blades into the reverse thrust range. In order to brake the aircraft after landing, the mechanical low pitch stop is released thereby enabling the pilot to schedule a blade angle in reverse thrust range. Since the mechanical low pitch stop must be released under load, it is highly desirable to reduce the power required to release the low pitch stop to a minimum. The present invention relates to a mechanical low pitch stop embodying roller means for reducing the frictional resistance to disengagement of the pitch stop to a minimum.

Accordingly, among my objects are the provision of an improved mechanical low pitch stop assembly for variable pitch propellers which is readily releasable under load; the further provision of a spring engaged, hydraulically releasable mechanical low pitch stop; and the still further provision of a releasable mechanical stop assembly including rotatable and nonrotatable members having engageable jaw means and roller means for preventing damage to the jaw means when the members are disengaged under load.

The aforementioned and other objects are accomplished in the present invention by incorporating rollers in one of the cooperable mechanical low pitch stop members whereby the frictional load which has to be overcome to release the mechanical low pitch stop is reduced to a minimum. Specifically, the propeller is of the general type disclosed in the Hirsch et al. Patent 2,855,056 and thus includes a hub having a plurality of propeller blades journalled for rotation about their longitudinal axes from a maximum reverse thrust position to a feathered position. Each blade may be actuated by an individual hydraulically operated servo motor and the pitch positions of the several propeller blades are coordinated by a master gear. Accordingly, the master gear has a predetermined angular position relative to the hub for each pitch position of the propeller blades from the full reverse angle to the full feathered angle.

The master gear is drivingly connected to a sleeve rotatable about the horizontal propeller axis during the pitch changing movement of the blades. This sleeve has an annulus drivingly connected thereto, which annulus constitutes the rotatable mechanical low pitch stop member. A complementary nonrotatable but axially movable low pitch stop member is connected to the hub by straight splines. The nonrotatable low pitch stop member has a plurality of circumferentially spaced axially extending lugs, or jaws, thereon, one face of each lug being chamfered and the edge of the other face of each lug being radiused. The rotatable pitch stop member likewise has a plurality of axially extending jaws thereon. One face of each jaw on the rotatable pitch stop member is chamfered so that when the chamfered faces of the jaws are in engagement the mechanical low pitch stop will be automatically released by imparting axial movement to the nonrotatable pitch stop member. This action only occurs when the propeller blades are moved to the feathering range.

The other face of each jaw on the rotatable pitch stop member has an arcuate groove, or socket therein, which subtends an angle greater than 180°. This socket is lined with a bearing material having a low coefficient of rolling friction, and each socket receives a roller. The rollers are held in assembled relation with the rotatable low pitch stop members by the sleeve which is connected to the master gear and a housing which encloses the mechanical low pitch stop assembly. When the propeller blades are moved in the decrease pitch direction to the flight idle angle, the rollers engage the faces of the jaws on the nonrotatable pitch stop member and prevent a further reduction in the pitch angle of the propeller blades. The axially movable pitch stop member is spring biased into engagement with the rotatable pitch stop member, and is also formed with a piston surface which can be subjected to hydraulic pressure for moving the nonrotatable pitch stop member axially out of engagement with the rotatable pitch stop member. During axial movement of the nonrotatable pitch stop member, the rollers rotate about their axes, and thus the frictional loads are reduced to those of rolling friction rather than sliding friction between the pitch stop members. In addition, the rollers prevent undue wearing of the jaws on the axially movable pitch stop member and enable the use of lower hydraulic pressures to release the mechanical low pitch stop.

Further objects and advantages of the present invention will be apparent from the following description, reference being had to the accompanying drawings, wherein a preferred embodiment of the present invention is clearly shown.

In the drawings:

FIGURE 2 is a sectional view of the rotatable low pitch stop annulus.

FIGURE 3 is a fragmentary view in elevation taken in the direction of arrows 3—3 of FIGURE 2 with the roller removed.

FIGURE 4 is a sectional view of the nonrotatable low pitch stop annulus.

Figure 1:
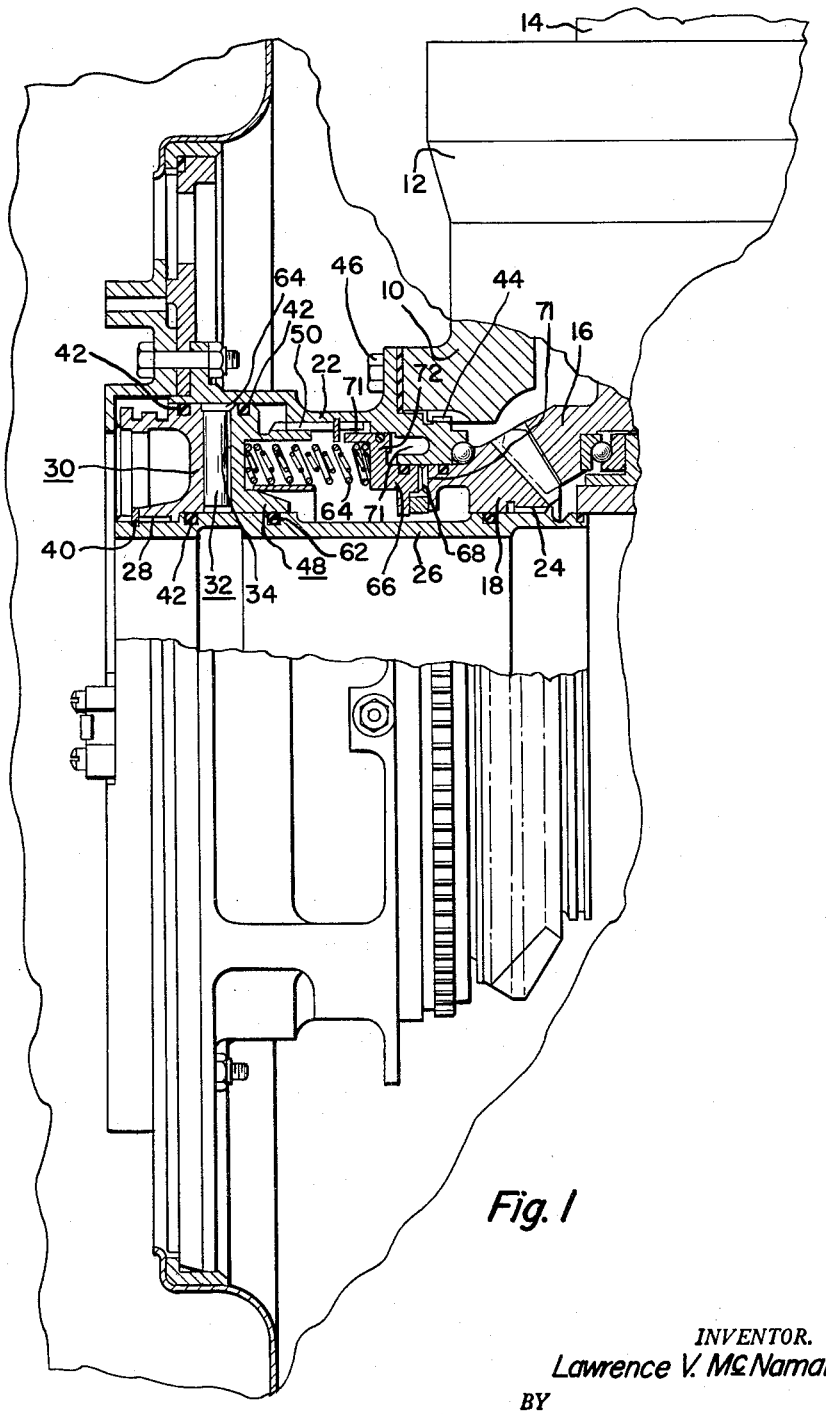
FIGURE 1 is a fragmentary view, partly in section and partly in elevation, of the improved mechanical low pitch stop assembly of the present invention.

With particular reference to FIGURE 1, the improved mechanical low pitch stop assembly is embodied in a variable pitch propeller having a hub 10 with a plurality of radially extending sockets 12, only one of which is shown in the drawings. Each socket 12 has a propeller blade 14 rotatably journalled therein for rotation about its longitudinal axis throughout a range of pitch positions from a maximum reverse angle to a full feathered angle. The root of each propeller blade 14 may enclose its own pitch changing motor, which motor may be of the type shown in the Martin et al. Patent 2,500,612. Each propeller blade 14 has an integral bevel gear sector 16, and the bevel gear sector of each blade meshes with a master gear 18 journalled for rotation relative to the hub 10 by ball bearing assembly 20.

The master gear 18 coordinates the pitch changing movements of all of the propeller blades, and thus has a definite angular position for each pitch position of the propeller blades. The inner race of the ball bearing 20 is integral with the master gear 18, and the outer race thereof is constituted by an annular housing 22. The master gear 18 has a straight spline connection at 24 with a sleeve 26 which is rotatable about the horizontal propeller axis. The sleeve 26 is connected by a set of straight splines 28 to an annulus 30.

With reference to FIGURE 2, the annulus 30 is formed with a plurality of axially extending, circumferentially spaced jaws 32. Each jaw 32 has a chamfer 34 on one edge and a socket 36 on the face opposite the chamfered edge. As seen particularly in FIGURE 3, the socket is formed by an arcuate groove which subtends an angle slightly greater than 180°. Each socket is lined with bearing material having a low coefficient of friction, which bearing material may comprise a silver base and a molybdenum overlay. Each socket 36 receives a roller 38 which can be inserted from either the top or the bottom of the jaws. The rollers 38 are free to rotate about their longitudinal axes relative to the jaws 32 and are effectively caged within the sockets since the sockets subtend an angle greater than 180°.

Referring again to FIGURE 1, the rollers 38 are also caged against radial movement by the sleeve 26 and the housing 22. The annulus 30 is restrained against axial movement relative to the propeller hub by a snap ring 40. The sleeve 26 carries an O-ring seal 42 which engages the inner periphery of the annulus 30, and the annulus 30 carries an O-ring seal 42 which engages the inner periphery of the housing 22.

The housing 22 has a straight spline connection at 44 with the hub 10 and is rigidly connected to the hub 10 by a plurality of bolts such as indicated by numeral 46. A second annulus 48 is disposed between a sleeve 26 and the housing 22. The annulus 48 has a straight spline connection at 50 with the housing 22, and is thus restrained against rotation relative to both the housing 22 and the hub 10. However, the annulus 48 is free to move axially relative to the housing 22 and the hub 10 whereby the annulus 48 can be engaged with and disengaged from the annulus 30.

As shown in FIGURE 3, the annulus 48 has a plurality of circumferentially spaced axially projecting jaws 52 thereon having chamfered faces 54 and radiused edges 56. The annulus 48 is also formed with a piston surface 58 having a groove 60 which receives an O-ring 62 as shown in FIGURE 2. The O-ring 62 sealingly engages the inner periphery of the housing 22, and the space 64 between the annulus 48 and the annulus 30 constitutes a servo chamber. The sleeve 26 carries a second O-ring seal 62 which sealingly engages the inner periphery of the annulus 48.

The annulus 48 is normally urged to the left, as viewed in FIGURE 1, into engagement with the annulus 30 by a circumferential set of coil springs 64. The coil springs 64 also act on a nonrotatable pitch lock member 66 supported for axial movement within the housing 22. The pitch lock member 66 has ratchet teeth 68 engageable with a complementary set of ratchet teeth 70 formed on the master gear 18. The nonrotatable pitch lock member 66 has a straight spline connection at 70 with the housing 22 and likewise includes a piston surface 72 forming a movable wall of a servo chamber 74. The pitch lock, per se, constitutes no part of this invention and operates in the manner set forth in copending application Serial No. 571,523, filed March 14, 1956 in the name of Hirsch et al. and assigned to the assignee of this invention, now Patent No. 2,882,975.

As alluded to hereinbefore, the sleeve 26, and hence the rotatable low pitch stop member 30, has a predetermined angular position for each pitch position of the propeller blades. The nonrotatable pitch stop member 48 is assembled with the propeller hub so that the faces of jaws 32 will engage the faces of jaws 52 at a predetermined low blade angle, for instance a positive 18°. The servo chamber 64 is normally connected to drain enabling the springs 64 to maintain the annulus 48 in engagement with the annulus 30. At the low pitch stop angle, the rollers 38 engage the faces of the jaws 52 to prevent further rotation of the annulus 32 in the decrease pitch direction.

Since the propeller blades 14 are subjected to centrifugal and aerodynamic twisting moments which tend to reduce propeller pitch, the load imposed on the coengaging faces of jaws 52 and rollers 38 in the faces of jaws 32 may be of substantial magnitude during propeller rotation. In order to disengage the mechanical low pitch stop, the chamber 64 is subjected to hydraulic pressure thereby effecting movement of the annulus 48 to the right, as viewed in FIGURE 1. During movement of the annulus 48 to the right rollers 38 rotate about their longitudinal axes and hence only rolling friction has to be overcome. The radiused edges 56 on the jaws 52 cooperate with the rollers 38 to prevent excessive wearing and shearing of the faces on jaws 52 during disengagement of the mechanical pitch stop under load. In addition, when the pitch position of the propeller blade is increased from an angle below low pitch stop angle to an angle above the low pitch stop angle, the radiused edges 56 facilitate reengagement of the stop members.

While the embodiment of the invention as herein disclosed constitutes a preferred form, it is to be understood that other forms might be adopted.

What is claimed is as follows:

1. A mechanical low pitch stop assembly for a variable pitch propeller having a hub with a plurality of blades journalled therein for rotation about their longitudinal axes, including a member rotatably supported within said hub and connected with said blades so as to rotate about the horizontal propeller axis during pitch changing movement of the blades, a first annulus attached to said member, a second annulus restrained against rotation relative to the hub but capable of axial movement relative thereto, the first and second annuli having a plurality of circumferentially spaced, axially extending jaws with engageable faces, the jaws of one annulus having sockets in their faces and caged rollers in said sockets, and resilient means engaging the second annulus to maintaining it in engagement with the first annulus to prevent rotation of the first annulus and movement of said blades below a predetermined angle, the second annulus having a piston surface which can be subjected to hydraulic pressure for moving the second annulus out of engagement with the first annulus to permit rotation of the first annulus and movement of the blades below said angle, the caged rollers in the faces of said jaws facilitating disengagement of the jaws on said first and second annuli under load without damaging the faces of said jaws.

2. A mechanical low pitch stop assembly for a variable pitch propeller having a hub with a plurality of blades journalled therein for rotation about their longitudinal axes, including, a member rotatably supported within said hub and connected with said blades so as to rotate about the horizontal propeller axis during pitch changing movements of said blades, a first annulus attached to said member for rotation therewith, a second annulus restrained against rotation relative to said hub but capable of axial movement relative thereto, said first and second annuli having axially extending jaw means with engageable faces, the jaw means on one annulus having socket means in the faces thereof and caged roller means in said socket means, means constantly acting on said second annulus for urging it into engagement with the first annulus whereby the engageable faces of said jaw means will prevent rotation of the first annulus and movement of the blades below a predetermined angle, and means operable to effect axial movement of the second annulus in opposition to said constantly acting means to disengage the engaging faces of said jaw means and permit rotation of the first annulus and movement of the blades below said angle, the caged roller means in the face of the jaw means facilitating disengagement of said jaw means under load without damaging the faces of said jaw means.

3. A mechanical low pitch stop assembly for a variable pitch propeller having a hub with a plurality of blades journalled therein for rotation about their longitudinal axes, including a member rotatably supported within said hub and connected with said blades so as to rotate about the horizontal propeller axis during pitch changing movement of said blades, a first annulus attached to said member so as to rotate therewith, a second annulus restrained against rotation relative to the hub but capable of axial movement relative thereto, first and second annuli having axially extending jaw means with engageable faces, the jaw means on one annulus having socket means in the faces thereof and caged roller means in said socket means, resilient means engaging the second annulus for normally maintaining it in engagement with the first annulus whereby the jaw means on said annuli will prevent rotation of the first annulus and movement of the blades below a predetermined angle, and means operable to effect axial movement of said second annulus in opposition to said resilient means to disengage the jaw means and permit rotation of the first annulus and movement of the blades below said angle, the caged roller means facilitating disengagement of the jaw means without damaging the faces thereof.

4. A mechanical low pitch stop assembly for a variable pitch propeller having a hub with a plurality of blades journalled therein for rotation about their longitudinal axes, including, a master gear connected to said blades for coordinating the pitch changing movements thereof, said master gear being rotatable about the horizontal propeller axis during pitch changing movement of said blades, a sleeve drivingly connected to said master gear so as to rotate therewith, a first annulus drivingly connected to said sleeve so as to rotate therewith, a housing rigidly connected to said hub and enclosing said first annulus, a second annulus disposed within said housing and having a straight spline connection with said housing whereby the second annulus is restrained against rotation but capable of axial movement relative to said housing, said first and second annuli having a plurality of circumferentially spaced axially extending jaws with engageable faces, the jaws on one annulus having sockets in their faces and caged rollers in said sockets, resilient means reacting between said housing and the second annulus for maintaining the second annulus in engagement with the first annulus so that the faces of the jaws on said annuli will engage each other to prevent rotation of the first annulus and movement of the blades below a predetermined angle, and means operable to effect axial movement of said second annulus in opposition to said resilient means to disengage the jaws and permit rotation of the first annulus and movement of the blades below said angle, the caged rollers in said jaws facilitating disengagement thereof under load without damaging the faces of said jaws.

5. The low pitch stop assembly set forth in claim 4 wherein the faces of the jaws on the first annulus have the caged rollers, and wherein the jaws of the second annulus have radiused edges on their faces.

6. The low pitch stop assembly set forth in claim 4 wherein the second annulus is formed with a piston surface, and wherein said annuli, said sleeve and said housing cooperate to form a servo chamber which can be subjected to hydraulic pressure to disengage said jaws.

7. A releasable mechanical stop assembly for a rotatable element including, a first member connected to said element for rotation therewith, a second member restrained against rotation but capable of axial movement relative to said first member, said first and second members having an axially extending jaw means with engageable faces, the jaw means on one of said members including socket means in the faces thereof and caged roller means in said socket means, means constantly acting on the second member for maintaining it in engagement with the first member whereby the engageable faces of said jaw means will limit rotation of said element in one direction at a predetermined angular position of the first member, and means operable to effect axial movement of the second member to disengage the jaw means and permit continued rotation of said element in said one direction beyond said predetermined angular position, said caged roller means facilitating disengegement of said jaws under load without damaging the faces thereof.

8. A mechanical low pitch stop assembly for a variable pitch propeller having a hub with a plurality of blades journalled therein for rotation about their longitudinal axes, including, a master gear connected to said blades for coordinating the pitch changing movements thereof, said master gear being rotatable about the horizontal propeller axis during pitch changing movement of said blades, a sleeve drivingly connected to said master gear so as to rotate therewith, a first annulus drivingly connected to said sleeve so as to rotate therewith, a housing rigidly connected to said hub and enclosing said first annulus, a second annulus disposed within said housing and having a straight spline connection with said housing whereby the second annulus is restrained against rotation but capable of axial movement relative to said housing, said first and second annuli having a plurality of circumferentially spaced axially extending jaws with engageable faces, each jaw on said first annulus having a socket in its face subtending an angle of more than 180°, a roller disposed within each socket, said sleeve and said housing coacting with said sockets to cage said rollers, resilient means reacting between said housing and the second annulus for maintaining the second annulus in engagement with the first annulus so that the faces of the jaws on said annuli will engage each other to prevent rotation of the first annulus and movement of the blades below a predetermined angle, and means operable to effect axial movement of said second annulus in opposition to said resilient means to disengage the jaws and permit rotation of the first annulus and movement of the blades below said predetermined angle, the caged rollers in said jaws facilitating disengagement thereof under load without damaging the faces of said jaws.

References Cited in the file of this patent

UNITED STATES PATENTS

| | | |
|---|---|---|
| 2,050,910 | Zancan | Aug. 11, 1936 |
| 2,882,975 | Hirsch et al. | Apr. 21, 1959 |